United States Patent
Phadke et al.

(10) Patent No.: US 8,789,604 B2
(45) Date of Patent: Jul. 29, 2014

(54) STANDALONE LIQUID LEVEL SENSING APPARATUS FOR TENSIONER SYSTEM

(75) Inventors: Ashutosh Chandrashekhar Phadke, Bangalore (IN); Vikranth Harthikote Nagaraja, Bangalore (IN)

(73) Assignee: Vetco Gray Inc., Houston, TX (US)

(*) Notice: Subject to any disclaimer, the term of this patent is extended or adjusted under 35 U.S.C. 154(b) by 77 days.

(21) Appl. No.: 13/337,821

(22) Filed: Dec. 27, 2011

(65) Prior Publication Data

US 2013/0161023 A1  Jun. 27, 2013

(51) Int. Cl.
*E21B 19/09* (2006.01)
*E21B 47/00* (2012.01)

(52) U.S. Cl.
USPC ..................... 166/355; 166/250.03

(58) Field of Classification Search
USPC ............ 166/345, 348, 352, 355, 367, 250.01, 166/250.03, 66, 75.14; 73/290 R
See application file for complete search history.

(56) References Cited

U.S. PATENT DOCUMENTS

| | | | | |
|---|---|---|---|---|
| 4,367,981 A | * | 1/1983 | Shapiro | 405/224.2 |
| 4,886,397 A | * | 12/1989 | Cherbonnier | 405/195.1 |
| 5,252,004 A | * | 10/1993 | Butler et al. | 405/211 |
| 5,846,028 A | * | 12/1998 | Thory | 405/195.1 |
| 6,869,254 B1 | | 3/2005 | Kershman | |
| 7,025,384 B2 | | 4/2006 | Whitehead et al. | |
| 2002/0189806 A1 | * | 12/2002 | Davidson et al. | 166/250.01 |
| 2007/0196182 A1 | * | 8/2007 | Ellis | 405/224.4 |
| 2008/0304916 A1 | * | 12/2008 | Crotwell et al. | 405/224.2 |

FOREIGN PATENT DOCUMENTS

| | | |
|---|---|---|
| EP | 2415959 A2 | 2/2012 |
| GB | 2478119 A | 8/2011 |
| WO | 2008051092 A1 | 5/2008 |
| WO | 2011074984 A1 | 6/2011 |
| WO | 2012016765 A2 | 9/2012 |

OTHER PUBLICATIONS

IEEE Publication: Acoustic-Based Liquid Level Determination in Process Vessels Using PVDF Sensors, Sanchez-Galicia, Stitt, Jackson and York IMTC 2006 Apr. 24-27, 2006.*
Search Report from corresponding GB Application No. GB1222452.3 dated Mar. 19, 2013.

* cited by examiner

*Primary Examiner* — Matthew Buck
*Assistant Examiner* — Stacy Warren
(74) *Attorney, Agent, or Firm* — Bracewell & Giuliani LLP (57) ABSTRACT

A riser tensioner has a cylindrical barrel and a piston rod that telescopingly engage each other. An external accumulator containing a hydraulic fluid and a gas is mounted outside of the barrels for communicating the hydraulic liquid to an end of the barrel. Depending on the stroke of the piston rod, the liquid level in the accumulator will fluctuate and the gas pressure vary. A composite rod within the accumulator is embedded with an array of PVDF sensors. The PVDF sensors provide an output signal to indicate the liquid level in the accumulator when the liquid comes in contact with the sensor, allowing for reliable monitoring of liquid levels.

12 Claims, 6 Drawing Sheets

STANDALONE LIQUID LEVEL SENSING APPARATUS FOR TENSIONER SYSTEM

BACKGROUND OF THE INVENTION

1. Technical Field

The present invention relates in general to a riser tensioner system used during the offshore drilling and production phases and, in particular, to a standalone liquid level sensing device for monitoring liquid level in a composite gas accumulator of the tensioner system. The proposed sensing device and methodology can be extended to any other pressure vessel for liquid level sensing.

2. Description of the Related Art

Risers are used in offshore oil and gas drilling and production for conveying drilling mud as well as production fluids through a subsea wellhead to a floating production platform, also known as tension leg platforms (TLP) or SPAR. Tensioners are employed at the platform to apply tension to the risers. During the drilling or production phases, a riser system is typically kept in tension in order to avoid structural instability of the drilling or production stackup. A typical tensioner comprises a telescoping piston and cylinder arrangement supplied with gas pressure from accumulators. Waves and currents cause the piston and cylinder to extend and retract.

In one type of tensioner design, the piston component comprises a barrel that slidingly engages the cylinder or other barrel. Each barrel has a closed end and an open end, the open end being in fluid communication with each other. The interiors of the barrels serve as the chamber for receiving gas pressure. A plurality of pistons may be utilized.

A fluid within the chamber provides lubrication to dynamic seals. Thus, liquid level inside the accumulator is critical to ensure effective lubrication of dynamic seals. By using the liquid level information inside the accumulator, gas volume can be measured. The gas volume can be used to provide damping stiffness for the riser tensioner system. A novel technique for monitoring the liquid level inside an accumulator is desired.

SUMMARY OF THE INVENTION

One embodiment of a system, method, and apparatus for a standalone liquid level sensor for a riser tensioner has a cylindrical barrel and a piston rod that telescopingly engage each other. An external accumulator or vessel is mounted outside of the barrels for communicating a gas quantity to one side of the barrel and a hydraulic liquid to an opposite side of the barrel. Depending on the stroke of the piston rod, the liquid level in the accumulator will fluctuate. The piston rod moves in and out of the cylindrical barrel in response to waves and currents. The external accumulator can be utilized as a Drilling Riser Tensioner (DRT) or as a Production Riser Tensioner (PRT).

A composite rod is mounted co-axially within the external accumulator. Sleeves at each end of the composite rod are used to secure the rod in place. Each sleeve has holes that allow gas or liquid to flow in or out of the accumulator, maintaining the status-quo. The composite rod is embedded with an array of polyvinylidene fluoride (PVDF) sensors. The PVDF sensors are disposed on the composite rod at desired intervals which provide an output signal to indicate the liquid level in the accumulator when the liquid comes in contact with the sensor, allowing for reliable monitoring of liquid levels. The PVDF sensor array produces a different output voltage depending on whether gas or liquid is in contact with the sensor.

The standalone liquid level sensing apparatus may advantageously be utilized with existing riser tensioner systems to accurately monitor liquid levels in an existing or third-party gas accumulator, can provide tensioner feedback to maintain riser system in constant tension, utilize low cost piezoelectric sensors, and possible recalculation of gas pressure and volume. No additional design changes to the accumulator are required. The dynamic gas volume measurement also facilitates detection of the gas leakage inside the accumulator, if any.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the present invention, which will become apparent, are attained and can be understood in more detail, more particular description of the invention briefly summarized above may be had by reference to the embodiments thereof that are illustrated in the appended drawings which form a part of this specification. It is to be noted, however, that the drawings illustrate only some embodiments of the invention and therefore are not to be considered limiting of its scope as the invention may admit to other equally effective embodiments.

DETAILED DESCRIPTION OF THE INVENTION

Figure 1:
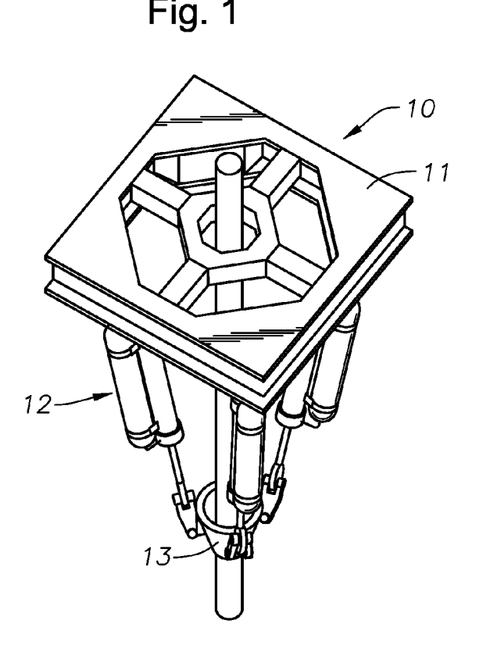
FIG. 1 is a perspective view of one type of tensioning system, constructed in accordance with the invention.
Figure 2:
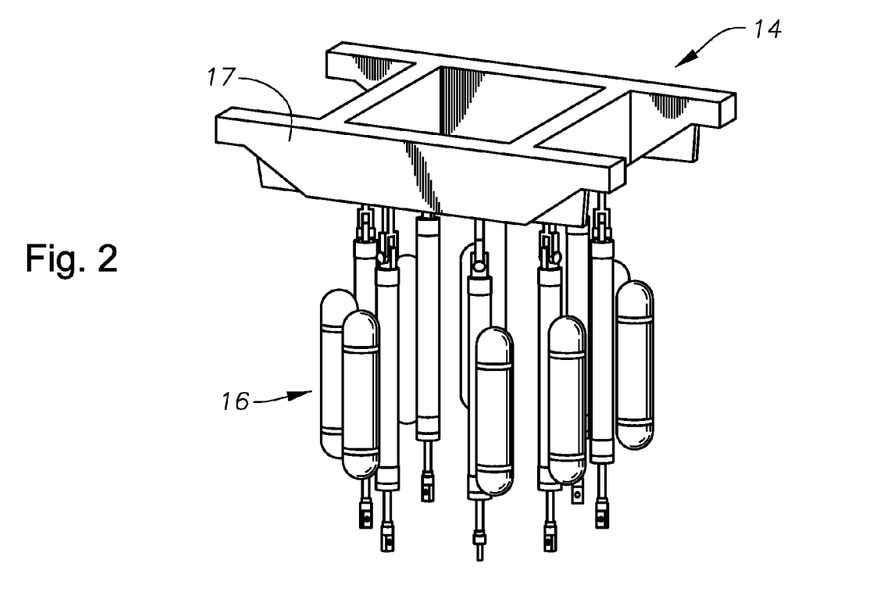
FIG. 2 is a perspective view of one type of tensioning system, constructed in accordance with the invention.

Referring to FIG. 1, one type of riser tensioning system ("RTS") 10 is depicted. The RTS 10 may be utilized to maintain tension on a drilling riser or a production riser. A piston assembly 12 is shown that connects at an upper end to a frame 11 of RTS 10 and at a lower end to a tensioner ring 13. In this embodiment, the piston assembly 12 is oriented at an angle relative to the riser. Referring to FIG. 2, another type of RTS 14 is depicted. A piston assembly 16 is shown that connects at an upper end to a frame 17 of the DRT and at a lower end to a tensioner ring (not shown). In this embodiment, the piston assembly 16 is oriented parallel to the riser. The piston assemblies 12, 16 for both RTS 10 and RTS 14 orientations are similar in their components and are further explained below.

Figure 3:
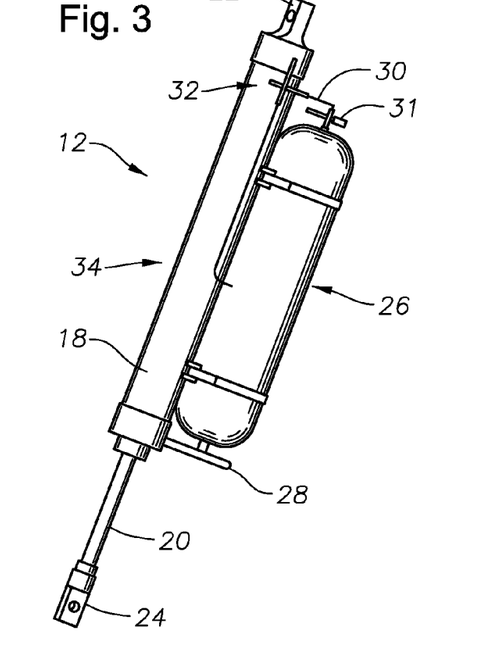
FIG. 3 is a perspective view of a piston assembly of FIG. 1.

Referring to FIG. 3, an embodiment of the piston assembly 12 of FIG. 3, is illustrated. It is understood that the piston assembly 16 is similar to the piston assembly shown in FIG. 1, with only difference in angle of piston barrel inclination with the vertical. Thus, this section in FIG. 3 serves to also describe such a configuration. The piston assembly 12 has a cylindrical barrel 18 that slidingly receives a piston rod 20. The barrel 18 may have an upper connection point 22 for connecting to the frame 17 (FIG. 3). The piston rod 20 has a connection point 24 for connection to a component such as a tensioner ring (not shown) (FIG. 2), which can heave as a result of waves and currents. Consequently, the piston rod 20 can also move in and out of the barrel 18 in response to such waves and currents.

Continuing to refer to FIG. 3, an accumulator or composite gas accumulator 26 is shown connected to the cylindrical barrel 18. The accumulator 26 is in fluid communication with a lower end of the cylindrical barrel 18 via a lower tube 28 and in fluid communication (N2 [nitrogen] gas or other suitable gas) with an upper end of the cylindrical barrel via an upper tube 30. Upper and lower tubes 30, 28 form a closed loop system with the barrel 18 and the accumulator 26. The connection of upper and lower tubes 30, 28 to the barrel 18 and the accumulator 26 will be explained further below. Upper tube 30 does not open within the barrel 18. The accumulator 26 may be cylindrical in shape and may contain a compressible gas and an incompressible fluid. The accumulator 26 and related components are further explained below. The accumulator 26 may be made of a carbon epoxy composite matrix, which can be manufactured using filament-winding technology. Further, a thermal and pressure relief device 31 may be located on the upper tube 30 and a low pressure relief device 32 may be located at the upper end of the cylindrical barrel 18. A hurricane isolation valve (not shown) may also be located on the barrel 18 at about mid-length on the barrel 18.

Figure 4:
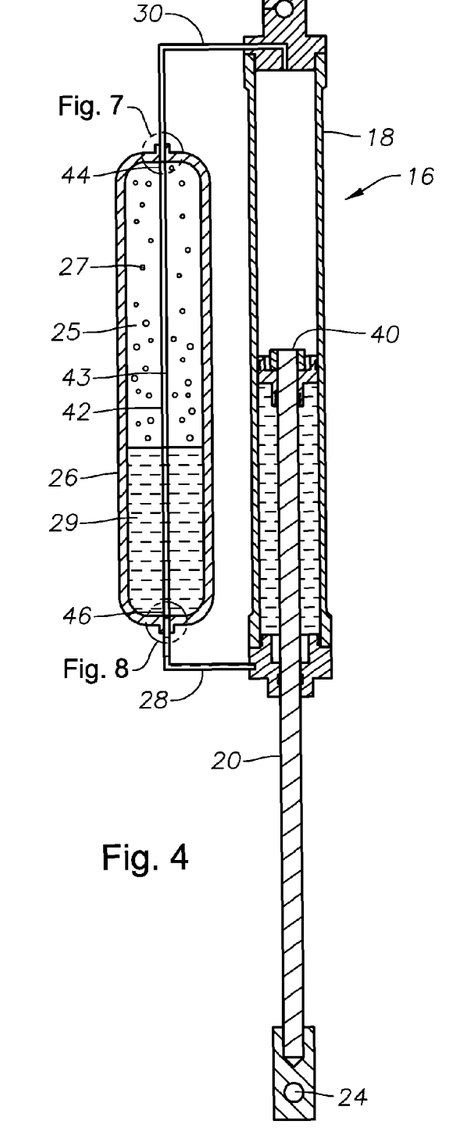
FIG. 4 is a sectional view of a piston assembly of FIG. 2, constructed in accordance with the invention.

Referring to FIG. 4, a sectional view of the piston assembly 16 is illustrated. During operation, the piston rod 20 will move in or out of the barrel 18 in response to waves and currents, thus maintaining a constant tension on a riser (not shown). A chamber 25 within the accumulator 26 in this embodiment contains both a gas 27 and a liquid 29. The gas 27 may be nitrogen N2 gas and the liquid 29 may be ethylene glycol, also known as erifon fluid. Other suitable gases and liquids may be utilized. In this embodiment, the N2 gas tends towards the upper end of the accumulator 26 and the ethylene glycol tends towards the lower end of the accumulator.

In this embodiment, when the piston rod 20 moves axially outward from the cylindrical barrel 18, a portion of ethylene glycol trapped below a piston 40 is forced out of the barrel 18 and into the accumulator 26 via the lower tube 28. The N2 gas is restricted from flowing into the barrel 18, resulting in the N2 gas occupying a smaller volume in the accumulator 26 which in turn results in the N2 gas being at higher pressure within the composite gas accumulator 26. Alternatively, the N2 gas can be allowed to flow out of the accumulator and into the barrel 18 via the upper tube 30. When the piston rod 20 moves axially inward from the cylindrical barrel 18, N2 gas inside the accumulator expands, reducing the gas pressure in the accumulator. As a result, the N2 gas in the accumulator 26 displaces ethylene glycol out of the accumulator and into the barrel 18 via the lower tube 28. The N2 gas remaining in the accumulator 26 occupies a larger volume and is thus at a lower pressure.

Referring to FIG. 4, a composite bar 42 is mounted from an upper end 44 and a lower end 46 within the accumulator 26. The composite bar 42 functions to indicate liquid levels, such as ethylene glycol, in the accumulator 26. Although the composite bar 42 is shown centrally located within the accumulator 26, it may also be located eccentrically. Composite bar 42 is located on a longitudinal axis of accumulator 26. The bar 42 may also be fabricated from materials other than a composite.

Figure 5:
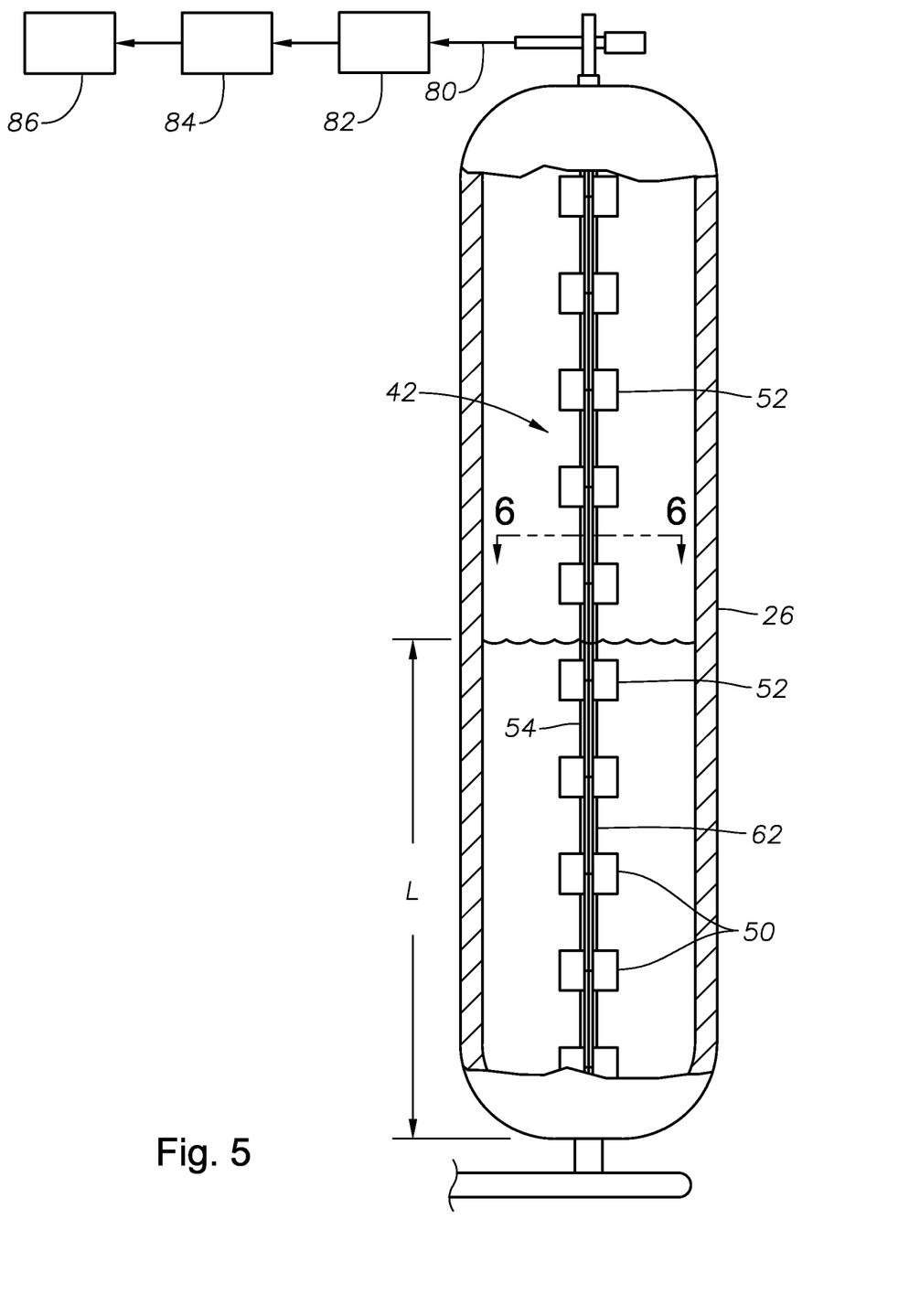
FIG. 5 is a sectional view of a composite bar in the accumulator tank of the piston of FIG. 4, constructed in accordance with the invention.
Figure 6:
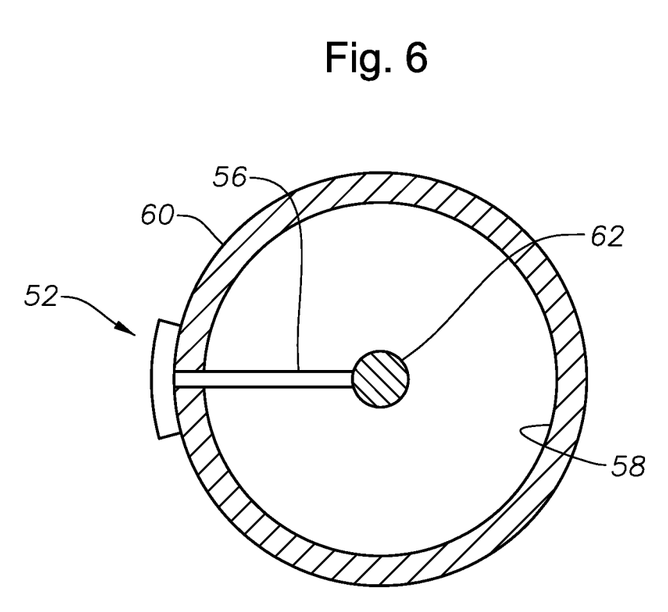
FIG. 6 is a plan view of a sensor on the composite bar of FIG. 5, constructed in accordance with the invention.

Referring to FIGS. 5 and 6, the composite bar 42 is further illustrated. The composite bar 42 may be cylindrical in shape and has an axial passage 43 extending from the lower end 46 to the upper end 44. The hollow composite bar 42 is open at the upper end 44 (FIG. 4) and closed at lower end 46 (FIG. 4) to prevent fluid from entering the interior of the composite bar. In this embodiment, the composite bar 42 includes a sensor array 50. The sensor array 50 may be a plurality of sensors 52 that may be in the form of films or strips and are made from PVDF embedded or bonded to an outer laminate 54 of the composite bar 42. The sensors 52 are further coupled to an electrode 56 (FIG. 6) that may be located within the hollow area or passage 43 of the composite bar 42. The electrodes 56 may extend radially inward into the hollow area 43 of the bar 42. The number of PVDF sensors 52, n, may vary and each may be monitored as an individual channel, as explained in a later section. Further, the sensors 52 may be fabricated in various types of shapes, including but not limited to circular, square, rectangular, and triangular.

PVDF is a piezoelectric material, which produces electricity in response to mechanical strain. Mathematically, the electrical-mechanical coupling of the PVDF can be described using strain-charge and stress-charge piezoelectric coupling equations. PVDF is a semi crystalline polymer consisting of long chain of molecules with $CH_2CF_2$ as a repeating unit. Although various types of piezoelectric materials may be utilized, PVDF has numerous advantages over other piezoelectric materials and is available in the form of thin films, which can be embedded or bonded to a composite. Some of these advantages include:

1. Highest tensile strength of all processable fluorocarbons;
2. Good radiation resistance;
3. Melt processable, allowing PVDF to be metalized and embedded with composite materials;
4. High abrasion and chemical resistance;
5. Can be used at temperatures of up to 150° C. (300° F.);
6. High flexibility, ruggedness, and light weight, and
7. Low acoustic impedance.

In this embodiment, the PVDF sensors 52 can have a thickness of up to 250 microns. Referring to FIG. 6, each electrode 56 may include an inner coating 58 on the inner surface of the sensor 52 and an outer coating 60 on the outer surface of the sensor. Inner and outer coatings 58, 60 are made from conductive silver ink to facilitate conduction. Each electrode 56 may be connected to a wire and routed upwards as a conductor to form an output wire assembly or bunch 62 that internally gathers each conductor signal from the lower end 46 (FIG. 4) to the upper end 44 (FIG. 4) of the composite bar 42. When one of the film sensors 52 is strained, the voltage response of the film sensor can be transmitted through the wire assembly 62 as an analog voltage output that can be analyzed further. Use of the voltage output is discussed further below.

Figure 7:
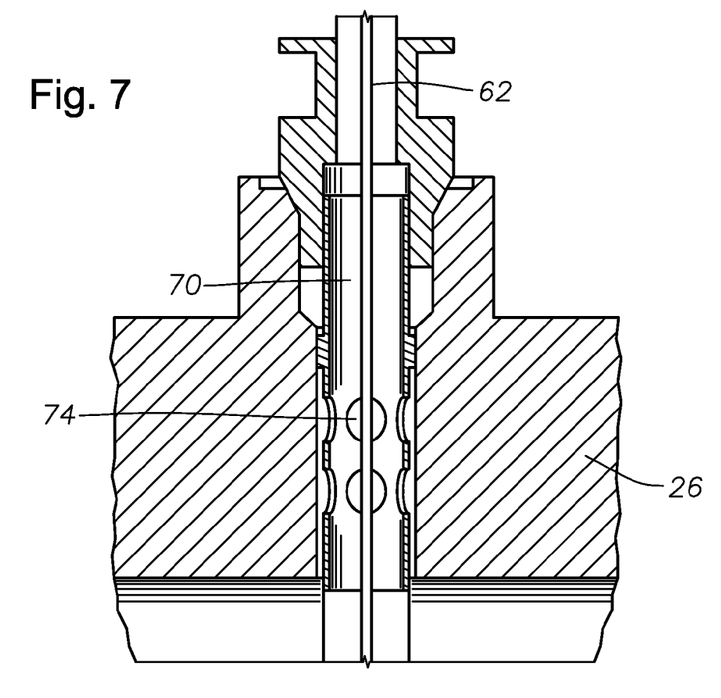
FIG. 7 is a sectional view of a sleeve for mounting top end of the composite bar, constructed in accordance with the invention.
Figure 8:
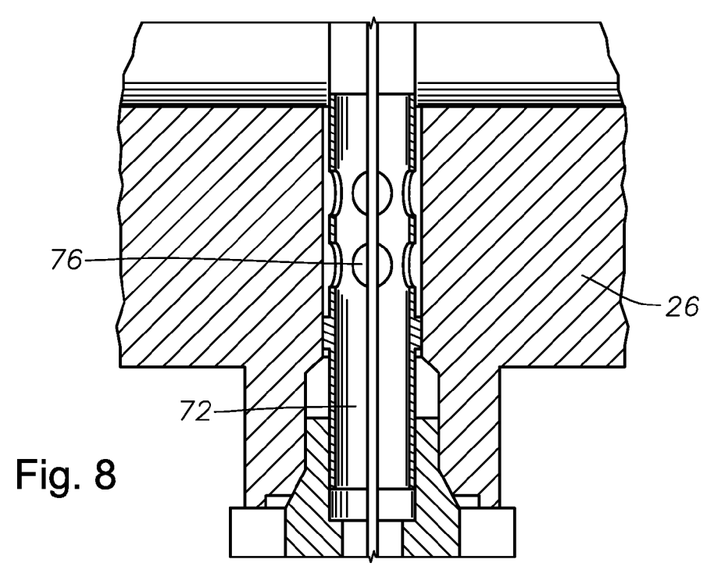
FIG. 8 is a sectional view of a sleeve for mounting at bottom end of the composite bar, constructed in accordance with the invention.
Figure 9:
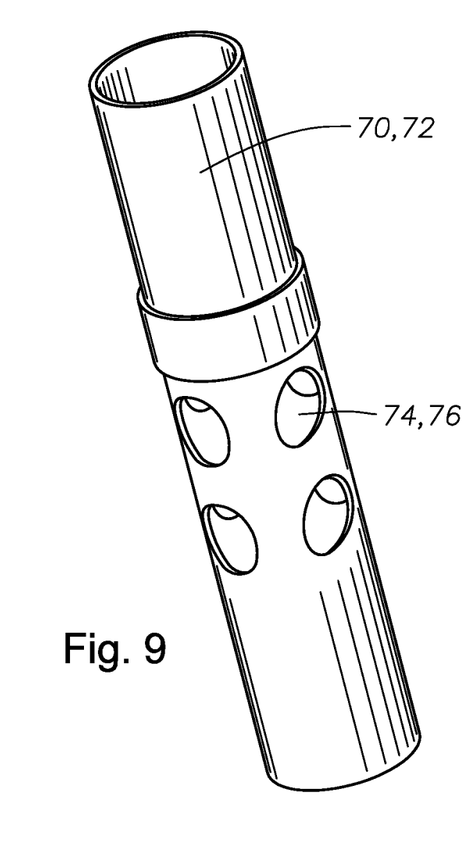
FIG. 9 is a perspective view of the sleeves of FIGS. 7 and 8.

Referring to FIGS. 7, 8, and 9, an upper mounting sleeve 70 and a lower mounting sleeve 72 are shown that secure the upper end 44 and lower end 46 of the composite bar 42, respectively. The sleeves 70, 72 may be metallic and may be installed onto each end of the accumulator 26 via interference fit. Alternatively, the sleeves 70, 72 may be threaded onto accumulator 26. Mounting sleeves 70, 72 may be used to mount the composite bar 42 in an existing accumulator of an existing tensioner system such as RTS 14 (FIG. 2) or RTS 10 (FIG. 1). Each mounting sleeve 70, 72 can have holes or passages 74, 76 as shown in FIG. 9. In upper mounting sleeve 70, the holes 74 allow N2 gas to exit accumulator 26 for the purposes of allowing a pressure gauge to display a pressure reading. In the lower mounting sleeve 72, the holes 76 allow the ethylene glycol fluid to enter the accumulator 26. As explained earlier, the lower end 46 of the composite bar 42 is closed to prevent fluid from entering the composite bar.

The embedded PVDF sensor array 50 at outer surface 54 of composite bar 42 thus can function as a liquid level sensing device that facilitates analog voltage output response, which is different for the ethylene glycol (liquid) and the N2 (gas). Voltage signals due to piezoelectric effect from each individual sensor of sensor array 52 can be taken to a platform via wire conduit 80 for monitoring and analysis by a data acquisition system (DAQ) 82, digital signal analyzer (DSA) 84, and a processor 86, to determine a level, L, of ethylene glycol inside the accumulator 26. Due to RTS 10, being very near to the platform (not shown), voltage signals are efficiently carried to the platform with minimal noise. In addition to monitoring the signal response at the platform, the frequency response from each individual sensor 52 will also be monitored because the frequency changes if the liquid level drops and that particular sensor is exposed to gas.

Figure 10:
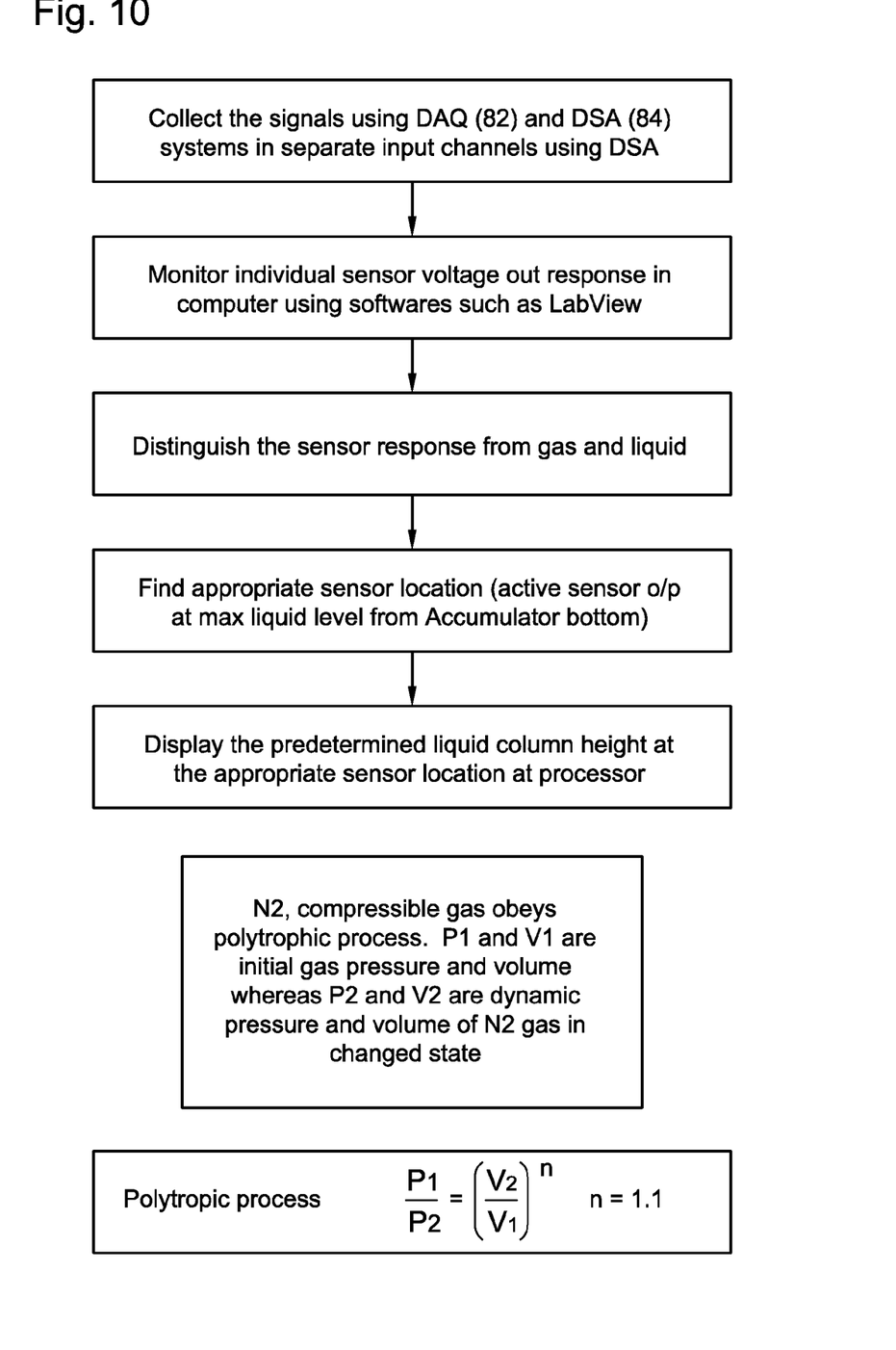
FIG. 10 is a high level flow diagram of one embodiment of a method in accordance with the invention.

During operation, the piston rod 20 (FIG. 4) may move axially outward or inward from the cylindrical barrel 18 (FIG. 4) in response to heaves or currents. When the piston rod 20 moves axially outward, a portion of ethylene glycol trapped below a piston 40 is forced out of the barrel 18 and into the accumulator 26 (FIG. 4) via the lower tube 28 (FIG. 4). The ethylene glycol is allowed to flow into the accumulator 26 through the holes 76 formed in the lower mounting sleeve 72 (FIG. 8). Thus, the level of ethylene glycol in the accumulator 26 rises and compresses the N2 within the accumulator, which at that point occupies a smaller volume within the accumulator. As illustrated by flow chart in FIG. 10, the DAQ 82 collects voltage output signals from the sensor array 50 where they signals are separated into input channels by the DSA 84. The channels correspond to the number, n, of sensors 52 in the sensor array 50. Voltage output signals from each sensor 52 may thus be monitored through the use of software, such as LabView®. Because contact with a liquid such as ethylene glycol causes a strain in the sensor 52 differs from a strain placed on the sensor by a gas such as N2, a voltage output signal that characterizes it, is produced that allows a sensor response to be distinguished between that of ethylene glycol or N2 gas. The DSA and processor can then provide an appropriate active sensor location that corresponds to maximum ethylene glycol level, L, as measured from the bottom of the accumulator 26. The appropriate sensor location can then be processed and the level or column height of ethylene glycol can then be displayed. Further, because N2 gas is a compressible gas, the processor can be utilized to calculate N2 gas pressure and volume in the accumulator 26 by applying polytropic process equation:

$$\frac{P1}{P2} = \left(\frac{V2}{V1}\right)^n$$

where:
P1 is the initial gas pressure;
V1 is the initial gas volume;
P2 is the dynamic gas pressure;
V2 is the dynamic gas volume. And
n=1.1 for nitrogen, n is a gas constant As previously explained, the response of each individual sensor 52 will be directly proportional to the strain experienced by the sensor. Thus, the strain experienced due to gas pressure will be different from the strain developed due to fluid interaction with the individual sensor 52. Thus, the first sensor can be located from the bottom side of the bar 42, which shows the response from the max liquid level in composite gas accumulator 26 (FIG. 4). An output response trend for the sensor may be determined for both gas and liquid interaction under specified conditions.

Figure 11:
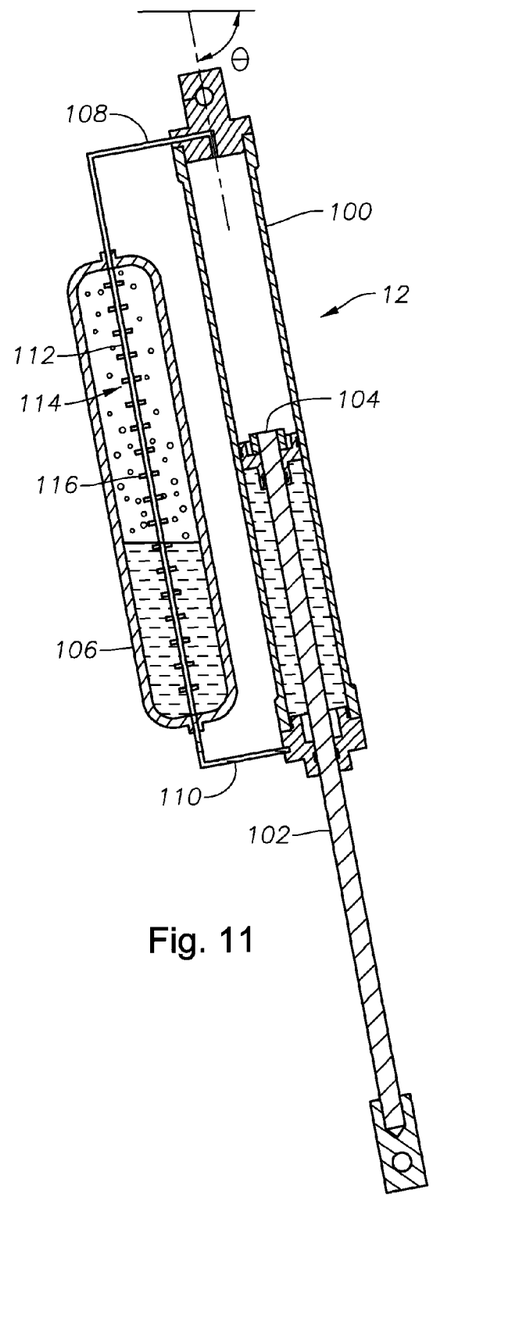
FIG. 11 is an additional embodiment for a piston assembly, constructed in accordance with the invention.

It is understood that one of ordinary skill in the art that the above methodology for obtaining, analyzing, and processing voltage output signals from the sensor array 50 is also valid for when the piston rod 20 moves axially inward of the barrel 18. In such a scenario, ethylene glycol in the accumulator 26 would flow into the barrel 18 via the lower tube 28, causing the level of ethylene glycol in the accumulator to drop. As explained in the previous section, the DAQ 82, DSA 84, and processor would collect, analyze, and process the resulting voltage outputs of the sensor array 50 to determine the level of ethylene glycol in the accumulator 26. In an additional embodiment, the piston assembly 12 of FIG. 1 is shown in FIG. 11. The piston assembly 12 is identical to piston assembly 16 (FIG. 4), having a barrel 100 and a piston rod 102 that axially moves inward and outward from the barrel 100 in response to heaves and currents. The piston assembly 12 also has a piston 104 that is connected to an upper end of the piston rod 102. The piston 104 traps liquid, such as ethylene glycol, below it. The piston assembly 12 is in fluid communication with a lower tube 110 for ethylene glycol liquid flow. An upper tube 108 may allow N2 gas to communicate with a pressure reading device such as a gauge but does not allow communication with the barrel 100. A composite bar 112 is mounted within the accumulator 106 as described in a previous section for the piston assembly 12. Further, a PVDF sensor array 114 made from a plurality of sensors 116 is embedded in the composite bar 106 as described in FIG. 5 and functions in the same manner to obtain, analyze, and process voltage output signals from the sensors 116. However, the piston assembly 12 is tilted at an angle θ from the horizontal, which can vary between 0 and 90 degrees. Another difference is in bonding or embedding the sensors in FIG. 11, sensors strips may be bonded or embedded exactly parallel to the horizontal given the inclined axis.

The level of the liquid ethylene glycol can thus be determined by the sensors 116 and subsequent processing by taking into account the tilt of the piston assembly 12.

While the invention has been shown or described in only some of its forms, it should be apparent to those skilled in the art that it is not so limited, but is susceptible to various changes without departing from the scope of the invention.

What is claimed is:

1. A tensioner for applying tension to a subsea member extending to a floating offshore structure, comprising:
   a cylindrical barrel;
   a piston rod that telescopingly engages the cylindrical barrel;
   an exterior accumulator for fluid and gas mounted external to the cylindrical barrel;
   a fluid conduit extending from the exterior accumulator to an exterior wall surface of the cylindrical barrel for communicating fluid therebetween;
   a gas conduit extending from the exterior accumulator to the exterior wall surface of the cylindrical barrel for communicating gas therebetween; and a fluid level indicator mounted within the exterior accumulator and that comprises a hollow bar with an open end and a closed end, and a plurality of PVDF sensors spaced along a length of the bar.

2. A tensioner according to claim 1, wherein one of the PVDF sensors is embedded or bonded in the bar.

3. A tensioner according to claim 2, wherein one of the PVDF sensors comprises a strip that wraps around an outer surface of the bar.

4. A tensioner according to claim 1, further comprising an electrode extending from the PVDF sensors that transmits a voltage output signal when the PVDF sensors are strained due to contact with a liquid or gas.

5. A tensioner according to claim 4, wherein the liquid in contact with the PVDF sensors is ethylene glycol and thereby creates a strain on the PVDF sensors.

6. A tensioner according to claim 4, wherein each of the electrodes of the PVDF sensors is in electrical communication with a data acquisition system.

7. A tensioner according to claim 6, wherein the fluid level indicator is mounted within the external reservoir via:
an upper sleeve having at least one passage communicating an interior surface with an exterior surface of the upper sleeve, and
a lower sleeve having at least one passage communicating an interior surface with an exterior surface of the lower sleeve.

8. A tensioner for use on an offshore platform, comprising:
a cylindrical barrel having a piston rod and in fluid communication with an accumulator;
a liquid conduit having ends respectively connected to the accumulator and to the cylindrical barrel and which selectively contains liquid;
a gas conduit having ends respectively connected to the accumulator and to the cylindrical barrel and which selectively contains gas;
a fluid level indicator mounted within the accumulator;
a composite bar mounted axially within the accumulator and having a passage extending from an open upper end to a closed lower end; and
a plurality of sensors disposed on an outer surface of the bar, wherein each of the sensors comprise a PVDF film and an electrode that transmits a voltage output signal when the PVDF film is strained due to contact with a liquid, so as to provide a signal indicative of whether the sensor is in contact with a liquid or a gas.

9. A tensioner according to claim 8, wherein the PVDF film is embedded or bonded to an outer laminate of the composite bar.

10. A tensioner according to claim 8, wherein the PVDF film wraps around an outer laminate of the composite bar.

11. A tensioner according to claim 8, wherein the electrode of each of the PVDF films is in electrical communication with a data acquisition system, a digital signal analyzer, and a processor for determining a liquid level within the accumulator via the voltage output signal from the PVDF film.

12. A tensioner according to claim 8, wherein the composite bar is mounted within the accumulator via:
an upper sleeve having at least one passage communicating an interior surface with an exterior surface of the upper sleeve, and
a lower sleeve having at least one passage communicating an interior surface with an exterior surface of the lower sleeve.

* * * * *